United States Patent [19]
Fishbein

[11] 3,734,207
[45] May 22, 1973

[54] BATTERY POWERED ORTHOPEDIC CUTTING TOOL

[76] Inventor: Meyer Fishbein, 12020 Saltair Place, Los Angeles, Calif. 90049

[22] Filed: Dec. 27, 1971

[21] Appl. No.: 212,484

[52] U.S. Cl.................................173/163, 310/50
[51] Int. Cl..............................................A61b 17/32
[58] Field of Search............173/163; 32/27, DIG. 8; 310/50; 30/272 A

[56] References Cited
UNITED STATES PATENTS

| 3,109,238 | 11/1963 | Marks | 173/163 X |
| 3,213,303 | 10/1965 | Riley et al. | 310/50 |
| 3,321,650 | 5/1967 | Pedone et al. | 310/50 X |
| 3,494,799 | 2/1970 | Pedone | 310/50 X |

*Primary Examiner*—Ernest R. Purser
*Attorney*—Forrest J. Lilly

[57] ABSTRACT

The invention provides a surgical electric power drill with self-contained batteries suspended from the butt end of a pistol grip handle in such an arrangement as to counterbalance the drill against top heaviness and toppling moments by locating the center of mass of the drill assembly within the pistol grip handle.

8 Claims, 8 Drawing Figures

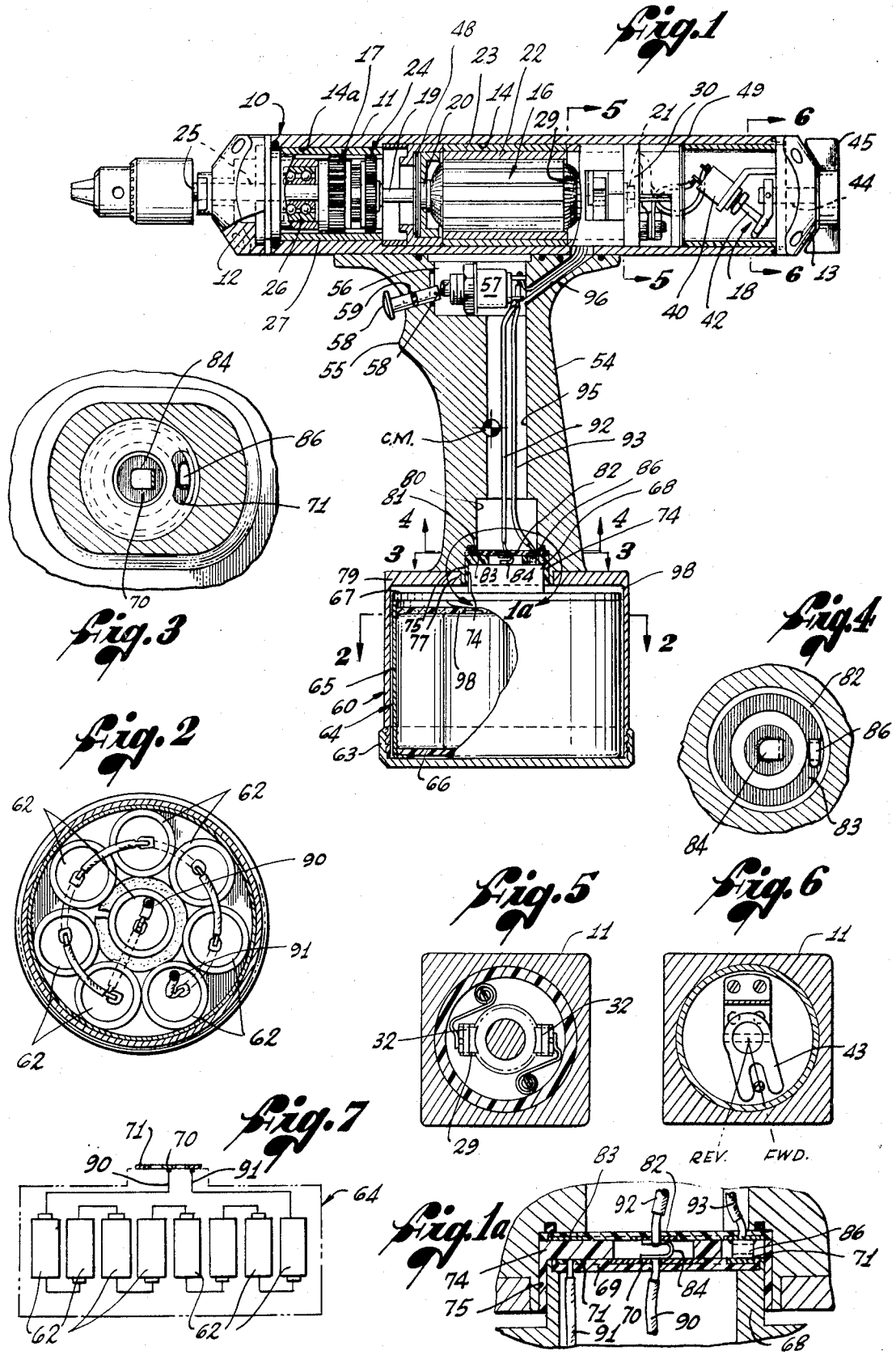

BATTERY POWERED ORTHOPEDIC CUTTING TOOL

BACKGROUND OF THE INVENTION

1. Field of the Invention

This invention relates to electric surgical drills such as are used by orthopedic surgeons for drilling bone in various surgical procedures, as for instance in hip socket surgery.

2. Description of the Prior Art

Electric surgical drills of the past have been powered either by self-contained batteries, or with electric cords connected to service outlets. Lightness is a desirable characteristic of the batteryless cord type, but the surgeon is often hampered by the cord. These disadvantages are overcome in the battery containing type. However, the energy requirement is sufficient that a fairly considerable battery weight is called for to meet some present surgical demands, and prior surgical drills with self-contained batteries of required energy storage capacity for these cases have tended toward somewhat awkward or inconvenient external form, as well as being no better than marginal as regards acceptable weight. This is true notwithstanding present availability of improved, compact rechargeable batteries of large energy capacity relative to bulk. Provided with a pistol grip handle, they have characteristically been top heavy, with a center of mass located too high for good balance above a pistol grip handle. Thus the surgeon experiences a feeling of such top heavy unbalance and may have the distracting impression that the weight of the drill is even greater than it actually is. The surgeon's steadiness while operating can obviously be adversely affected thereby. The immediate predecessor to my present drill had a horizontal motor barrel containing, from rear to front, a reverse switch, a motor, a reduction gear, and in front thereof, a chuck. An elongated battery case barrel intersected this horizontal barrel on the underside, at about the middle, and extended downwardly therefrom, at a rearward incline. The surgeon grasped this battery case barrel somewhere along it, as the handle. The batteries were, in substantial part, right up within his operating hand. The point of balance of the drill was thus above his hand, so that he experienced a toppling couple tending to rotate the drill in a vertical plane. He thus was forced to control this couple, in addition to bearing the dead weight of the drill, while performing delicate bone surgery.

Thus there has been a need for an improved, battery powered drill, of large energy storage capacity, and still perfectly manageable by the surgeon as regards weight, balance and absence of force couples. A primary purpose of the invention is to achieve such a perfect balance and arrangement of component parts that the hand of the surgeon holding the pistol grip handle has within his grasp the actual center of mass of the drill. He thus would experience no force couples, the drill would be perfectly balanced in his hand. The aim is to give the surgeon the feel of lightness, balance and perfect maneuverability, leading him to improved deftness, steadiness and improved work. Still another disederata is compactness, and a disposition of component parts in a manner that minimizes awkwardness and bulk or extension in inconvenient locations or directions, while at the same time contributing to good feel, balance and convenience.

SUMMARY OF THE INVENTION

The deficiency in the prior art explained above is fulfilled by the invention through providing, first, a barrel containing an electric motor, reduction gear set, and drive shaft, together with, preferably, a reversing switch, and mounting on the inside of the barrel a contoured pistol grip handle, shaped to fit the hand of the user, and so as to guide the hand of the user to a predetermined position on the pistol grip at which bast balance is attained. The upper part of the pistol grip is hollowed out to receive the OFF/ON switch, and is provided with a switch operating trigger. Below this pistol grip handle, and secured to the lower end thereof, is a laterally enlarged cylindrical cannister, somewhat greater in diameter than height, to receive the battery pack. The latter consists of a group of batteries, in this case eight in number, nested into a compact assembly. This cannister and its contents constitutes a weight hung from the lower end of the pistol grip handle which lowers the center of mass of the drill as a whole until it is contained within the confines of the pistol grip handle, preferably in the middle region thereof. The pistol grip handle extends vertically downward from the center of mass of the motor barrel and parts contained therein or protruding therefrom, so the center of mass of this barrel and contents will be generally or approximately aligned vertically with the pistol grip handle, but quite high, e.g., somewhat above the bottom of the center portion of the motor barrel. The battery cannister hung from the bottom of the pistol grip handle then lowers the center of gravity of the drill as a whole down into the pistol grip handle, to a point such that the surgeon no longer is conscious of or bothered by any unsteadying top heaviness or resulting force couples. It is contemplated that the output drive shaft will carry a Jacob's chuck for coupling, e.g., to a bone drilling bit. These components, when added, shift the center of mass of the drill as a whole a little forward and upward, but not so much as to displace it very far, and it remains generally inside the surgeon's grasp.

BRIEF DESCRIPTION OF THE DRAWINGS

FIG. 1 is a longitudinal section, with parts in elevation, showing an illustrative embodiment of my drill;

FIG. 1a is a fragmentary enlargement of a portion of FIG. 1;

FIG. 2 is a transverse section on line 2—2 of FIG. 1;

FIG. 3 is a transverse section taken on line 3—3 of FIG. 1;

FIG. 4 is a transverse section taken on line 4—4 of FIG. 1;

FIGS. 5 and 6 are transverse sections taken on lines 5 and 6, respectively, through the motor mounting barrel; and FIG. 7 is a schematic wiring circuit for the battery pack.

DESCRIPTION OF AN ILLUSTRATIVE EMBODIMENT

In the drawings, numeral 10 designates the drill assembly of the invention, comprised essentially of a motor housing barrel 11, in this instance of square cross section (FIGS. 5 and 6), with removable end caps or closures 12 and 13 secured at its front and rear ends respectively. The barrel has a cylindrical bore 14, for in-line reception of electric motor 16, reduction gear set 17, and motor reversing switch 18. Motor 16 has a shaft 19, mounted in bearings at 20 and 21. The motor armature rotates inside a magnetic stator 22, which is fitted tightly inside a mounting cylinder 23 received on the bore 14 of barrel 12. The motor mounting cylinder 23 is so located in barrel 12, in relation to a presently mentioned reduction gear, and other components of the drill assembly, inclusive of a pistol grip handle, and a battery cannister suspended from the latter, so as to locate the center of mass C.M. of the drill assembly in a position within the pistol grip handle, as will be more fully discussed hereinafter.

Motor drive shaft 19 drives reduction gear set 24, which may be of any known type, and which drives, at a suitable reduced speed, an output drive shaft 25. This shaft 25 has a bushing at 26, and projects through end cap 12, suitable shaft seals being provided, as known in the art. As here shown, the reduction gear set is contained in an outer stationary internal gear cylinder 27 received in a reduced barrel bore 14a.

To the rear of the motor armature, and encircling the commutator 29, is a brush holder ring 30, which also mounts the rear motor bearing indicated at 21. This ring 30 carries the brushes 32.

Mounted on the rear end closure 13 is a motor reversing toggle switch 40, whose operating lever 42 is actuated by a fork 43 on a short shaft 44 mounted for rotation in the center of cap 13. The shaft 44 is operated by an external handle 45. The various components as thus described contained inside barrel 11 are provided with various transverse walls and spacing sleeves, as shown, and spring Bellville washers at 48 and 49 maintain these in tight engagement, each to the next.

Fitted and secured to the underside of the barrel 11, in the central region thereof, is a pistol grip handle 54, contoured to afford a comfortable fit to the human hand, and particularly shaped at the front, near the top, with a prominence 55 that constrains the user to grasp the pistol grip just under its beak. Below this prominence is the pistol grip handle proper; above it, the handle is flanged at front and rear to extend and improve the mounting to the barrel. In the tip of the handle 54 is a recess 56 which receives ON and OFF switch 57, operated by trigger 58 reciprocable in a bore 59 slanting up in the handle from a point just above prominence 55 into the recess 56. The switch 57 is of the type having an actuating button such as 58, with a self-contained spring (not shown) normally biasing it to its open position.

Fitted to and suspended from the lower end of handle 54 is a battery pack cannister 60, and it is a feature of the invention that this cannister is cylindrical, with a vertical axis, and sized to receive a pack of eight series-connected rechargeable nickel cadmium dry cell batteries 62, one in the center, surrounded by a group of seven, and all vertically oriented. This affords a very compact package of reasonably small vertical extent, and reasonably small diameter as well. The cannister thus avoids bulkiness, such as could bother the surgeon while operating. Enough batteries can also be used this way, in a compact, out-of-the-way cannister, to afford required operating voltage for the motor and work contemplated.

The cannister 60 has a screwthreaded cap 63 on its lower end, and the desirability of a screwthreaded connection is one important reason for the cylindrical shape. The screw-threaded connection affords the easiest possible gas tight seal. An inner cylindrical battery container 64 is received nicely inside the cannister 60, and comprises, in the preferred form, a thin aluminum cylindrical side wall 65, flanged at the bottom to support a phenolic bottom disc 66, and fitted at the top with a removable but close fitting top disc 67.

The disc 67 has an upwardly projecting neck 68, which seats at the top an insulation disc 69 in which are mounted two concentric, annularly spaced inner and outer electrical contacts 70 and 71, the former being a circular disc and the latter an annular slip ring surrounding the first. This neck 68 is receivable inside an inverted insulation cup 74 seated in the bottom of the pistol grip handle in a bore 75. Around the bore 75, the lower end of the pistol grip handle has an annular flange 77 which is fitted tightly inside a corresponding bore in the top wall 79 of cannister 60. Above the bore 75 in handle 54 is a reduced bore 80 providing a shoulder at 81 on which is seated an insulation disc 82 having on its lower side an annular electrically conductive slip ring 83. In the center of the disc 82, on the bottom, is mounted an electrically conductive spring contact 84. The latter is adapted to make contact with the aforementioned electric contact disc 70. On the inside of annular slip ring 83 is an electrical contact 86 adapted to make contact with the aforementioned slip ring 71. The top of the insulation cup 74 is apertured to receive these contacts 84 and 86.

The leads 90 and 91 from the series-connected batteries are connected to the contacts 70 and 71, respectively, and corresponding leads 92 and 93 connected to contacts 84 and 86, respectively, continue the circuit up through bore 80, thence through a further reduced bore 95, and on up through recess 56, and a passageway 96 into the motor barrel, where conventional connections, not necessary to detail herein, are made to the motor 16 and the reversing switch 40.

The space inside battery container 65, above its top wall 67, is packed with a shock resistant insulating material, preferably a paper base phenolic material.

It will be understood from the foregoing how the drive motor 16 is powered under the control of the ON and OFF and reverse switches from the battery pack contained inside cannister 60 and no further description thereof should be necessary. In common electrical drills of this type, seals are made at all outlets, since it is important that the drill assembly as a whole be gas tight. The possibility of a spark in an operating room wherein possible explosive gases may at times be present is, of course, realized in the art, and is guarded against by appropriate seals.

In assembling the batteries into the cannister 60, the container is elevated until the electrical contacts are made by screwing the cap 63 finally home. If one of the contacts extends further down than the other, as is preferable, the circuit will not be closed when contact is made with one of the circuit leads, and will be made only as the cap is screwed fully home and the other electrical contact made.

The motor barrel 11, end caps 12 and 13, handle 54, and cannister 60 are fabricated from aluminum, and have an anodized finish. The motor barrel and contained parts of the illustrated embodiment have a combined weight of one pound eight ounces. The handle 54 has a weight of 10 ounces, and the cannister and contained battery pack have a weight of 1 pound 10 ounces. This makes a total weight, excluding the Jacob's chuck, of 3 pounds 12 ounces. According to the invention, the center of mass of the combined motor barrel and contents, and handle, speaking generally, is slightly forward relative to the length of the barrel. The handle inclines a little rearwardly in the downward direction, and its mass distribution has this incline. It is also quite high, and without the battery cannister, the assembly is definitely top heavy when held by the handle. The battery cannister is suspended from the approximate center of the lower end of the barrel, which has the effect of both lowering the center of mass of the assembly, and shifting it rearward. I have contrived an unique arrangement in which placement of the battery cannister locates the final center of mass C.M. well down approximately mid-way between the bottom of the barrel and the top of the cannister, and well back, approximately mid-way between the front and rear surface of the pistol grip, inside the grasp of the user. The surgeon's hand then experiences no top heaviness, or unbalance of any kind. The drill feels light, balanced, and steady and the surgeon can do his best work. The addition of the Jacob's chuck moves the center of mass slightly up and forward from the position shown, but it remains within the zone of convenience and balance.

The present embodiment of the invention is, or course, for illustrative purposes only and many changes in design, structure and arrangement can be made without departing from the spirit and scope of the invention.

What is claimed is:

1. A hand held battery-powered surgical power tool, including:
   a motor barrel containing therein an electric motor, reduction gear means driven by said motor, and an output drive shaft driven by said reduction gear means, said shaft projecting from an end of said barrel;
   a pistol grip handle mounted on a side of said barrel in a generally central region of said barrel; and
   a battery pack cannister affixed to and extending in its entirety beyond the butt end of said pistol grip handle;
   said tool having its parts so weighted and distributed that, with a battery pack in said cannister, its center of mass falls generally in the region of said pistol grip handle.

2. The subject matter of claim 1, in which the parts are balanced with said center of mass located inside the boundaries of the pistol grip handle, approximately mid-way between the bottom of the barrel and the top of the battery cannister.

3. The subject matter of claim 2, wherein said pistol grip handle is formed in its upper front region with a prominence constraining the grip of the operator to be taken therebelow, and said center of mass is spaced below said prominence.

4. The subject matter of claim 3, wherein said center of mass is located generally mid-way between the front and rearward surfaces of said handle.

5. The subject matter of claim 1, wherein said battery cannister is in the form of a cylinder, whose axis is generally parallel to the general direction of extension of the pistol grip handle, and including a bottom in the form of a screw cap.

6. The subject matter of claim 5, wherein a battery pack in said battery cannister comprises a group of cells including a centrally positioned cell surrounded by a plurality of encircling cells.

7. The subject matter of claim 5, including a cylindrical battery pack container received inside said cannister, a removable top wall on said container, a neck extending upwardly from the top wall of said container there being a bore in said pistol grip handle opening through the butt end thereof for receiving said neck, an insulation plug in said neck and spaced electrical contacts at the top of said plug, electrical leads from said battery pack connected to said contacts, an insulation disc seated in said bore in said pistol with electrical contacts thereon adapted to be engaged by said contacts at the top of said plug, and electric circuit leads extending from said last mentioned contacts through said pistol grip handle and into said motor barrel adapted to energize said motor.

8. The subject matter of claim 1, wherein said pistol grip handle is inclined generally rearwardly in the direction from its junction with the barrel to its butt end, said battery cannister being cylindrical in shape, with the axis of the cylinder generally vertical when the barrel is held generally horizontal, the axis of said cylindrical cannister substantially intersecting the center of the butt end of the pistol grip handle.

* * * * *